Figure 1:
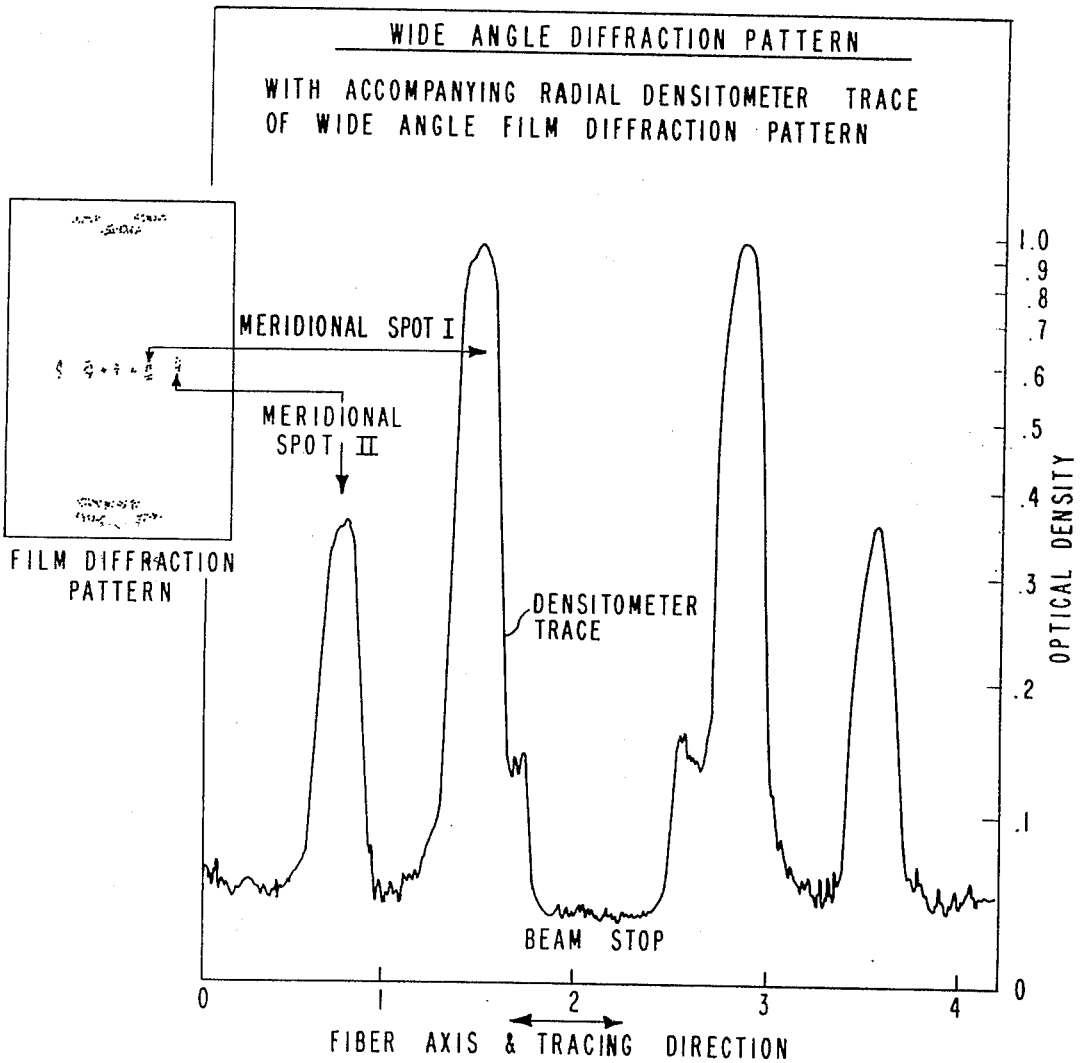
Figure 2:
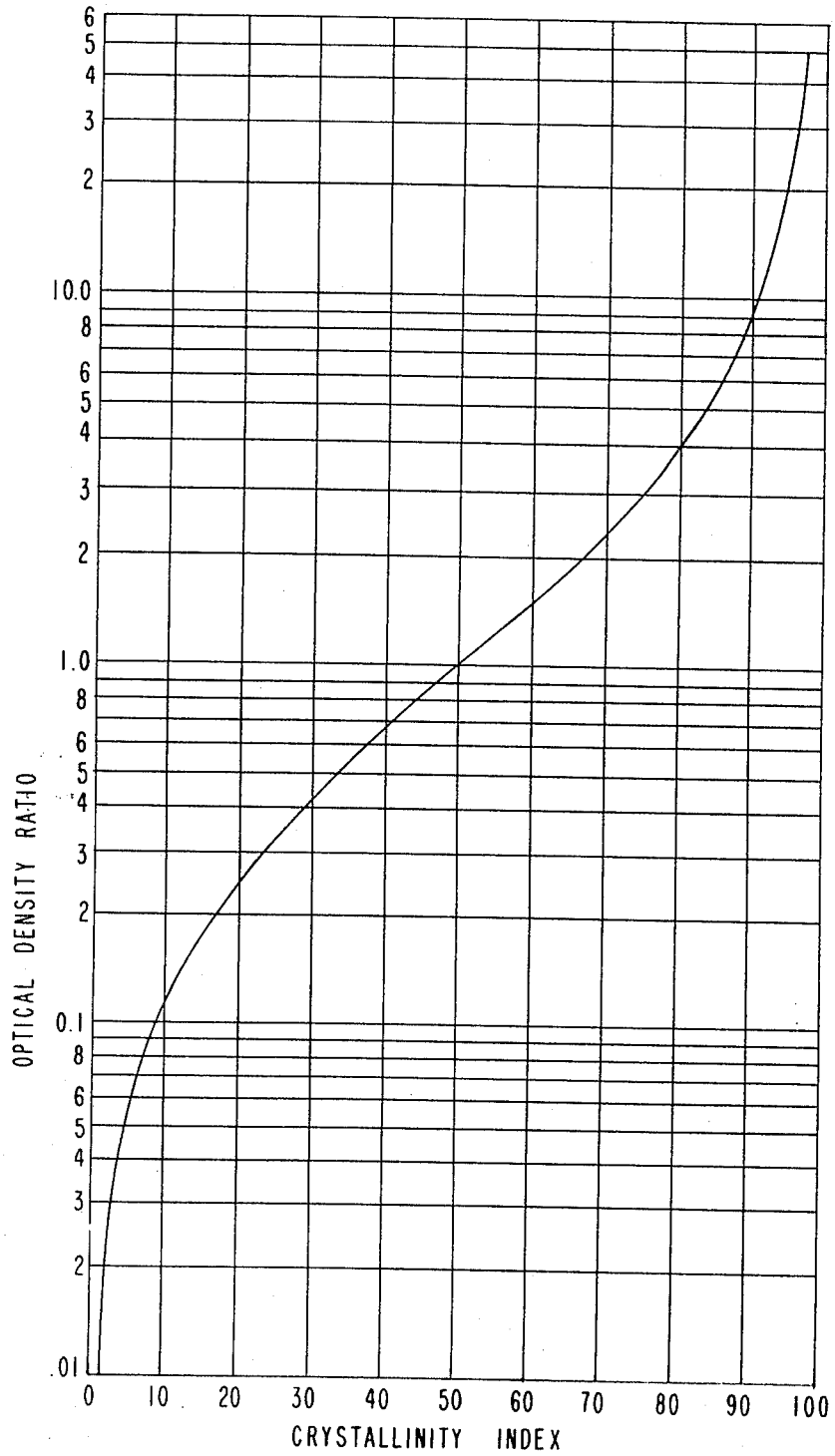

DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED MARCH 4, 1975

932 O.G. 10

T932,007

PROCESS FOR TEXTURING A FEED YARN

Donald Rocky Bradley, 10 S. Cliffe Drive, Wilmington, Del. 19809; George Daniel Null, Good Hope Road, #2, Landenberg, Pa. 19350; and Kenneth Bedros Takvorian, 22 White Clay Crescent, Newark, Del. 19711

Filed Feb. 19, 1974, Ser. No. 443,206
**Int. Cl. D02g *1/02***
U.S. Cl. 57—157 TS
2 Sheets Drawing. 26 Pages Specification

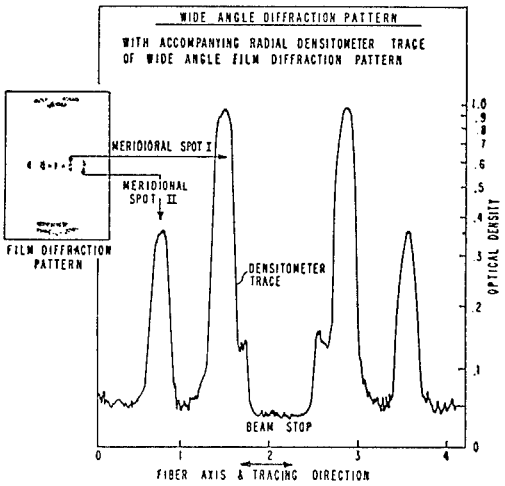

A process for texturing a feed yarn is provided wherein the feed yarn is comprised of a plurality of continuous substantially straight filaments constituted at least 90% by weight of repeating polymeric units of bis(4-cyclohexylene) methane dodecanediamide (PACM–12) with at least 60% of the bis(4-cyclohexylene) methane (PACM) portion of the units being in the trans-trans isomer form and have a crystallinity index less than 20. The process comprises false-twist texturing the said feed yarn by twisting the filaments to at least 50 turns per inch (t.p.i.), heating the twisted filaments until the crystallinity index increases by at least 0.5 units but not over a total of about 35 units, cooling and untwisting the filaments in a continuous operation to give an improved false-twisted yarn having adequate stretch, and fabrics therefrom having good wear-wrinkle recovery and good tailorability.

PROCESS FOR TEXTURING A FEED YARN

Filed Feb. 19, 1974 2 Sheets-Sheet 1

PROCESS FOR TEXTURING A FEED YARN

Filed Feb. 19, 1974 2 Sheets-Sheet 2